(12) United States Patent
Chen

(10) Patent No.: US 9,032,851 B2
(45) Date of Patent: May 19, 2015

(54) ADJUSTMENT DEVICE FOR AN AUXILIARY FENCE

(71) Applicant: Rexon Industrial Corp., Ltd., Taichung (TW)

(72) Inventor: Jung-Huo Chen, Taichung (TW)

(73) Assignee: REXON INDUSTRIAL CORP., LTD., Taichung (TW)

(*) Notice: Subject to any disclaimer, the term of this patent is extended or adjusted under 35 U.S.C. 154(b) by 275 days.

(21) Appl. No.: 13/672,034

(22) Filed: Nov. 8, 2012

(65) Prior Publication Data

US 2013/0125726 A1    May 23, 2013

(30) Foreign Application Priority Data

Nov. 23, 2011    (TW) .............................. 100142932 A

(51) Int. Cl.
| | |
|---|---|
| *B23D 33/02* | (2006.01) |
| *B23D 47/04* | (2006.01) |
| *B27B 27/10* | (2006.01) |
| *B23D 45/04* | (2006.01) |
| *B23D 47/02* | (2006.01) |

(52) U.S. Cl.
CPC .............. *B23D 47/04* (2013.01); *B23D 45/042* (2013.01); *B23D 47/02* (2013.01); *B27B 27/10* (2013.01)

(58) Field of Classification Search
USPC ............. 83/471.3, 477–477.2, 581, 446, 448, 83/438, 490, 471, 471.2; 144/285, 287
See application file for complete search history.

(56) References Cited

U.S. PATENT DOCUMENTS

| | | | | |
|---|---|---|---|---|
| 2,818,892 | A * | 1/1958 | Price ................................ | 83/454 |
| 3,466,025 | A * | 9/1969 | Kimber ............................ | 269/53 |
| 3,964,361 | A * | 6/1976 | Allaire ......................... | 83/471.3 |
| 4,452,117 | A * | 6/1984 | Brickner et al. ................ | 83/468 |
| 4,875,399 | A * | 10/1989 | Scott et al. .................... | 83/468.3 |
| 5,235,889 | A * | 8/1993 | Brickner et al. ............. | 83/471.3 |
| 5,406,873 | A * | 4/1995 | Garuglieri .................... | 83/471.3 |
| 6,161,459 | A * | 12/2000 | Ceroll et al. .................... | 83/468 |
| 8,276,895 | B2 * | 10/2012 | Brown et al. ................... | 269/45 |
| 8,539,870 | B2 * | 9/2013 | Behr ............................ | 83/471.3 |
| 2004/0154449 | A1 * | 8/2004 | Parks et al. ................. | 83/477.2 |
| 2005/0262985 | A1 * | 12/2005 | Talesky ........................... | 83/581 |
| 2011/0226110 | A1 * | 9/2011 | Sheddy et al. ............... | 83/477.1 |

* cited by examiner

*Primary Examiner* — Omar Flores Sanchez
(74) *Attorney, Agent, or Firm* — Bacon & Thomas, PLLC

(57) ABSTRACT

An adjustment device for an auxiliary fence includes a support frame, an auxiliary fence, a guiding unit and an adjusting unit. The guiding unit guides the auxiliary fence along a longitudinal direction such that the auxiliary fence is selectively slidable relative to the support frame. The adjusting unit allows the auxiliary fence to be adjusted relative to the support frame and securely positioned. The adjusting unit includes a driving member, a securing member installed on the driving member, and an elastomeric element. When the driving member is operated, the securing member becomes disengaged from the support frame which allows the position of the auxiliary fence to be adjusted by sliding it relative to the support frame.

19 Claims, 10 Drawing Sheets

ADJUSTMENT DEVICE FOR AN AUXILIARY FENCE

CROSS REFERENCE TO RELATED APPLICATION(S)

This application claims, under 35 U.S.C. §119, priority to Taiwanese Application No. 100142932, filed Nov. 23, 2011, which application is hereby incorporated by reference in its entirety, inclusive of the specification, claims, and drawings.

FIELD OF THE INVENTION

The present disclosure relates to a machine tool, and more specifically, to an adjustment device for an auxiliary fence of a sawing machine.

BACKGROUND

Worktables with support devices that hold and direct various types of work pieces, such as wood, for cutting with saws and the like are known. These support devices may include guides such as fences, which can be used to safely direct cutting a work piece. Referring to FIGS. 1 and 2, a conventional sawing machine (i.e. miter saw) includes a base 1, a worktable 2 rotatably disposed on the base 1, and a cutting unit 3 which is coupled to the worktable 2. The base unit 1 comprises a base plate 101, two support legs 102 respectively mounted to two lateral sides of the base plate 101, two support frames 103 which are respectively mounted to the two support legs 102, two auxiliary fences 104 which are respectively disposed on outer lateral sides of the corresponding support frames 103, and two adjusting units 105 which are adapted for adjusting positions of the auxiliary fences 104 relative to the support frames 103. The adjusting units 105 are respectively engaged to the corresponding support frame 103 and the auxiliary fence 104. Each adjusting unit 105 includes two guiding slots 106 formed on the auxiliary fence 104 and two knobs 107 respectively extending through the corresponding guiding slot 106 which are adapted for fastening/unfastening the auxiliary fence 104 with the support frame 103.

When adjusting the position of the auxiliary fence 104 relative to the support frame 103, a user first loosens the two knobs 107 such that the auxiliary fence 104 is vertically slidable relative to the support frame 103; when the auxiliary fence 104 is adjusted to a desired position, the user respectively fastens the two knobs 107, such that the auxiliary fence 104 is securely positioned relative to the support frame 103 and is at an appropriate height relative to the worktable 2 for allowing cutting operation to be appropriately performed.

However, drawbacks of the conventional sawing machine are that, when adjusting the auxiliary fence 104, the user has to first use one hand to grasp the auxiliary fence 104, for allowing another hand to respectively loosen/fasten the knobs 107, which is inconvenient to operate and can also be time consuming. Additionally, because the knobs 107 have to be loosened/fastened respectively, the forces applied to the knobs 107 may be varied, such that the knobs 107 may be fastened with unequal forces. Furthermore, since the knobs 107 have to be respectively loosened/fastened, it is possible that the auxiliary fence 107 may be tilted horizontally upon adjustment due to adjusting the two knobs 107 individually. This prevents the cutting operation from being performed smoothly.

SUMMARY

An objective of the present invention is to provide an adjustment device for an auxiliary fence which is easy to operate and can be quickly adjusted.

To achieve these and other objects of the present disclosure, the adjustment device for an auxiliary fence in accordance with the present disclosure comprises a support frame, an auxiliary fence, a guiding unit, and an adjusting unit which is adapted for adjustably positioning the auxiliary fence relative to the support frame. The support frame has a first guiding portion and a second guiding portion which are formed on the support frame and are parallel relative to each other. The first guiding portion and the second guiding portion are longitudinally extending along a substantially vertical direction. The auxiliary fence is slidably disposed on a lateral side of the support frame. The guiding unit is disposed between the support frame and the auxiliary fence for guiding the auxiliary fence to slide along the support frame in the substantially vertical direction. The adjusting unit has a driving member, a securing member, and an elastomer. The driving member is pivotally connected to the auxiliary fence, the securing member is secured to the driving member. The securing member slidably engages with the first guiding portion. The elastomer is disposed between the driving member and the auxiliary fence for constantly urging the securing member to orient toward the first guiding portion.

By utilizing the adjusting unit and the guiding unit, a position of the auxiliary fence relative to the support frame can be quickly and easily adjusted.

BRIEF DESCRIPTION OF THE DRAWINGS

These and other features, aspects, and advantages of the present disclosure will become better understood with regard to the following description, appended claims, and accompanying drawings.

Figure 1:
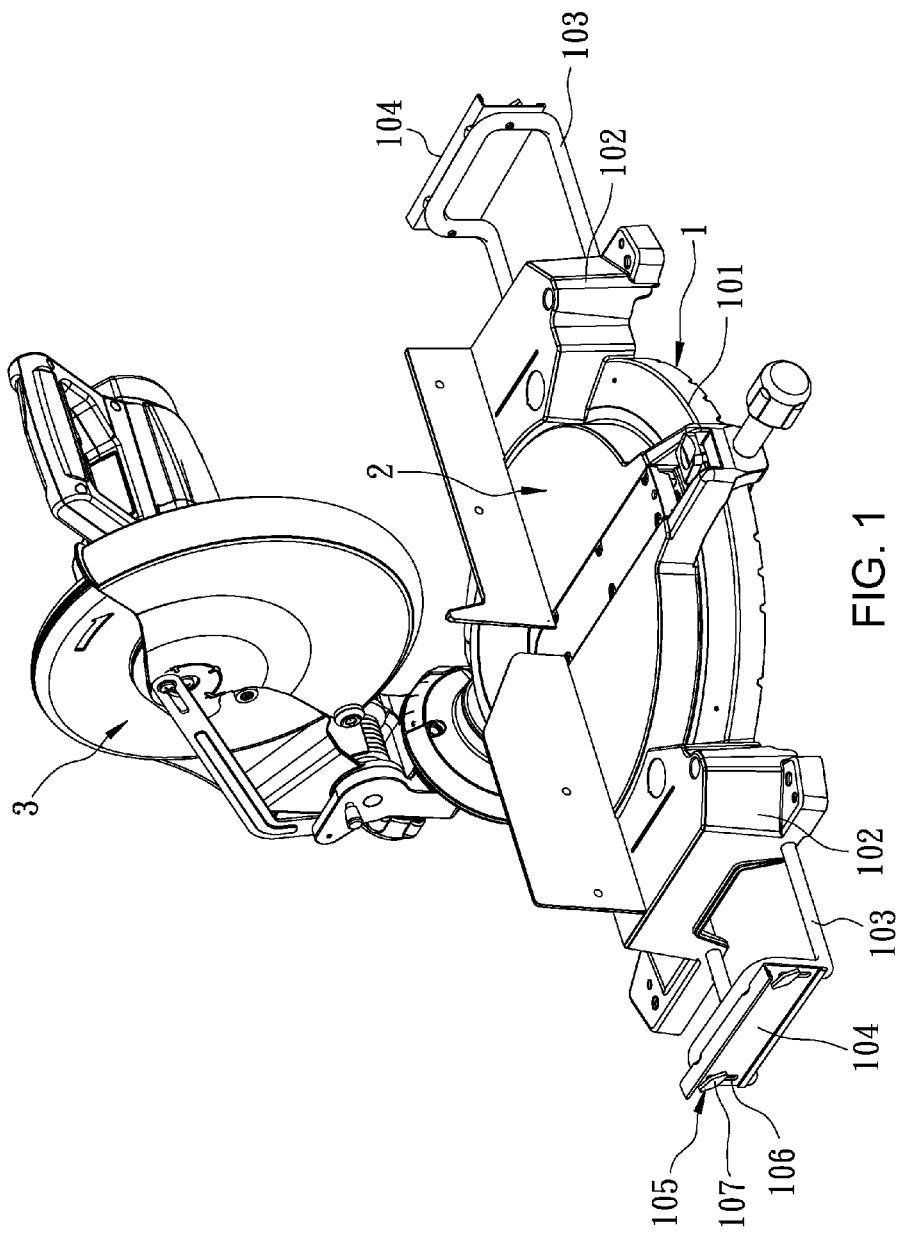
FIG. 1 is a perspective view of a prior art sawing machine.
Figure 2:
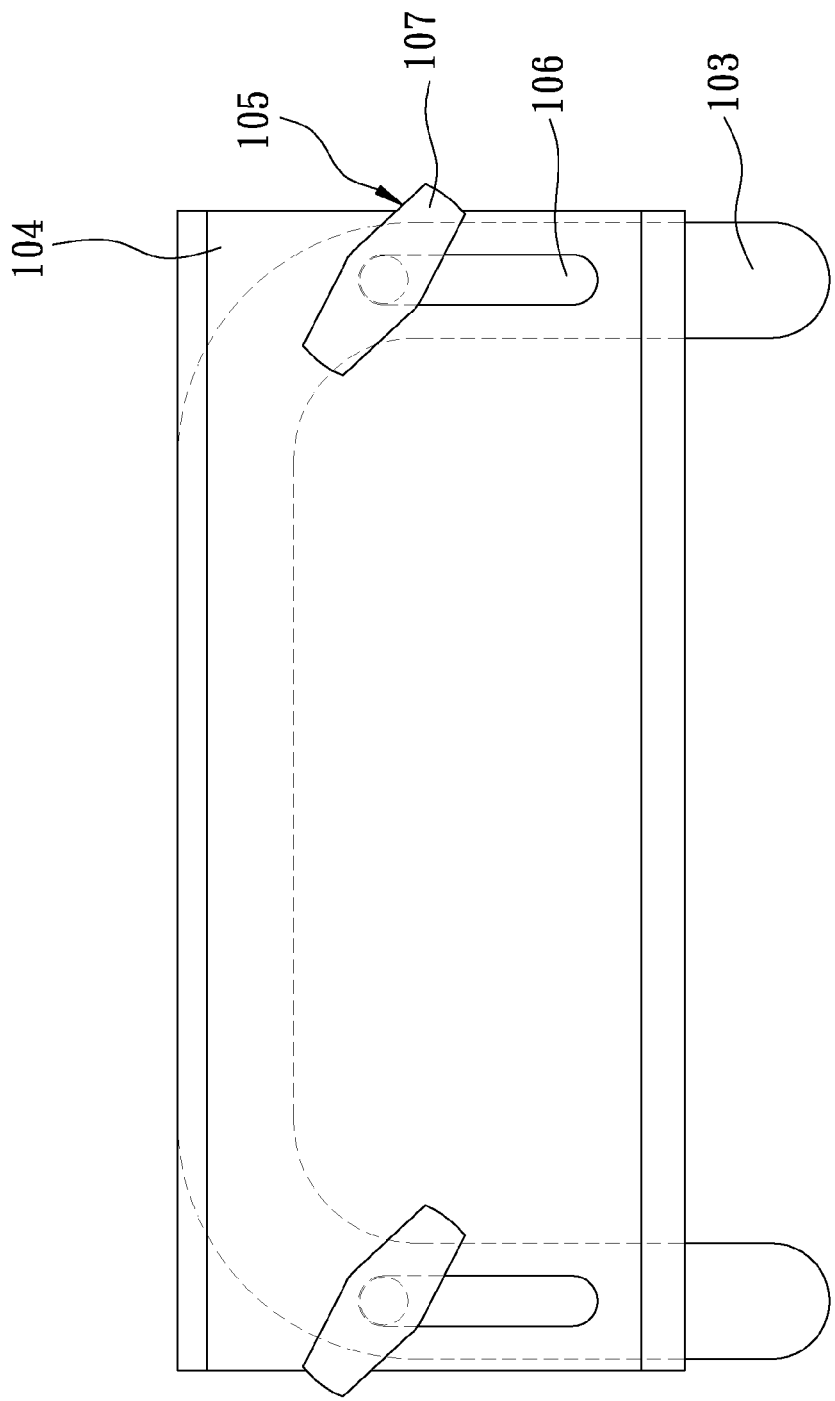
FIG. 2 is a front elevation view of a prior art adjustment device for an auxiliary fence.

It should be noted that the drawing figures are not necessarily drawn to scale, but instead are drawn to provide a better understanding of the components thereof, and are not intended to be limiting in scope, but rather to provide exemplary illustrations. It should further be noted that the figures illustrate exemplary embodiments of an auxiliary fence and the components thereof, and in no way limit the structures or configurations of an auxiliary fence and components thereof according to the present disclosure.

DETAILED DESCRIPTION OF VARIOUS EMBODIMENTS

A better understanding of different embodiments of the invention may be had from the following description read in conjunction with the accompanying drawings in which like reference characters refer to like elements.

While the disclosure is susceptible to various modifications and alternative constructions, certain illustrative embodiments are shown in the drawings and are described below in detail. It should be understood, however, that there is no intention to limit the disclosure to the specific embodiments disclosed, but on the contrary, the intention is to cover all modifications, alternative constructions, combinations, and equivalents falling within the spirit and scope of the disclosure.

Figure 3:
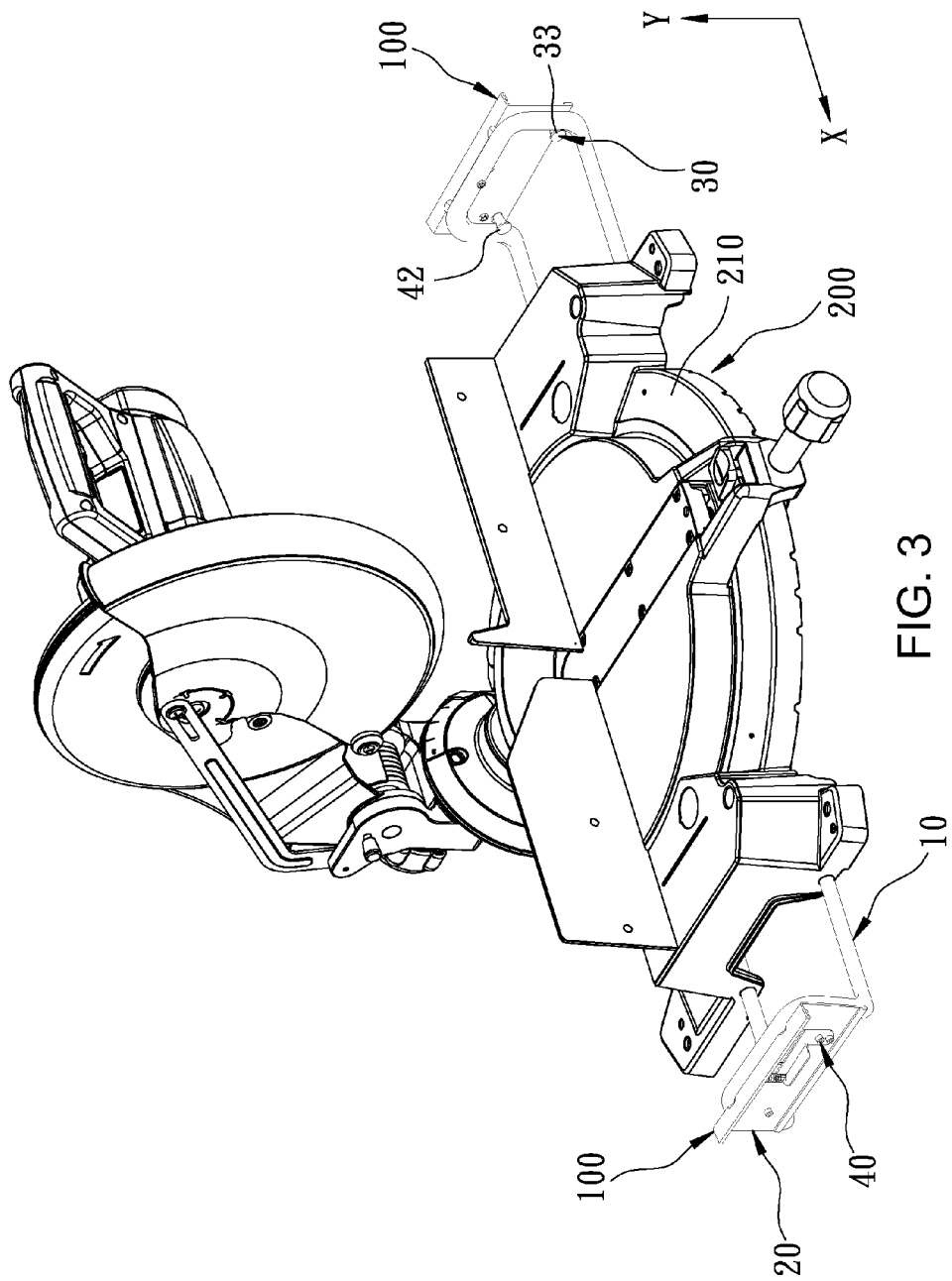
FIG. 3 is a perspective view of an adjustment device for an auxiliary fence in accordance with the first embodiment of the present disclosure, wherein the adjustment device is assembled with the sawing machine.
Figure 4:
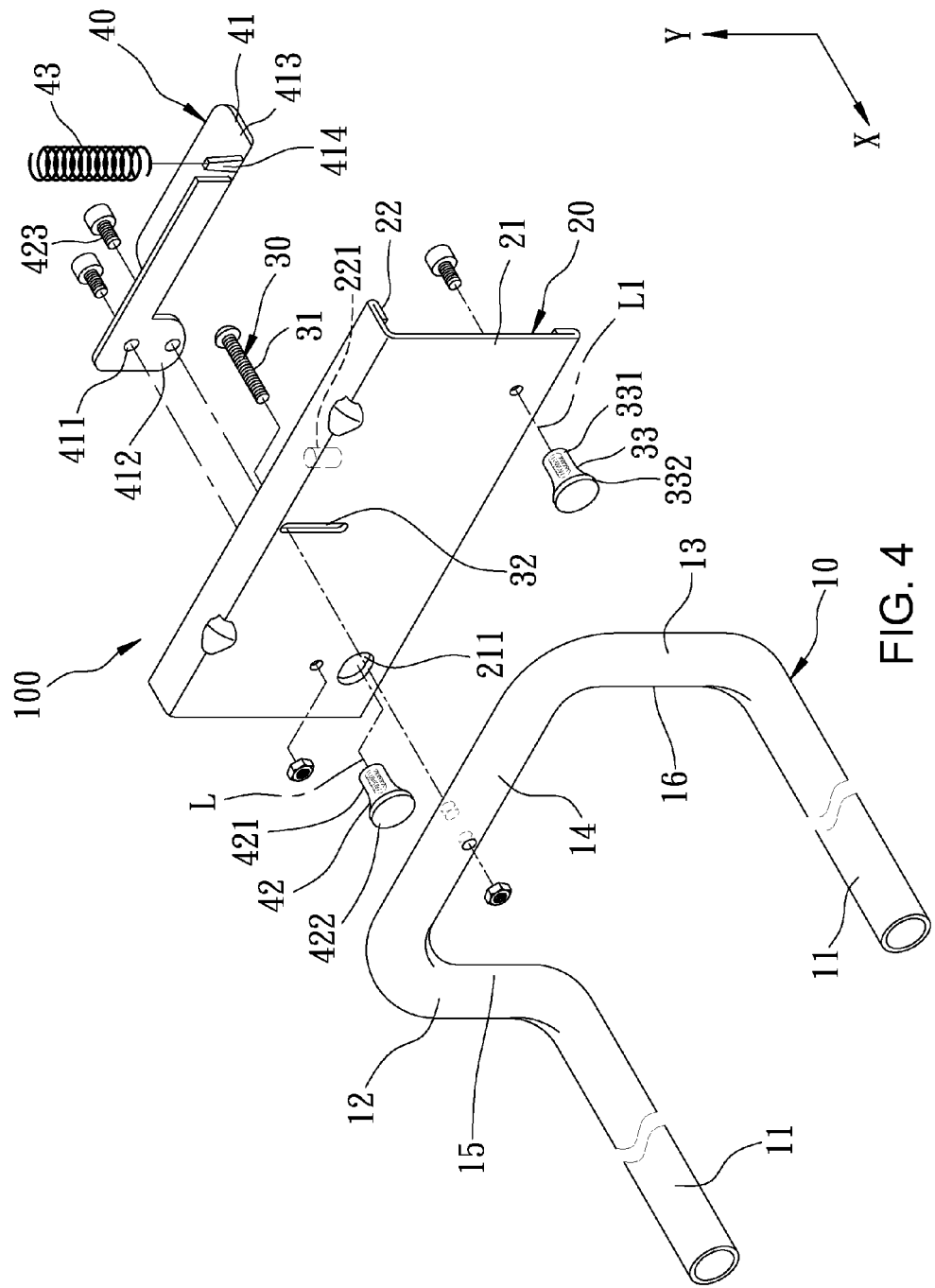
FIG. 4 is an exploded perspective view of the adjustment device for an auxiliary fence in accordance with the first embodiment of the present disclosure.

It will be understood that, unless a term is expressly defined in this disclosure to possess a described meaning, there is no intent to limit the meaning of such term, either expressly or indirectly, beyond its plain or ordinary meaning Referring to FIGS. 3 and 4, the adjustment device for an auxiliary fence in accordance with the present disclosure is mounted to a base 210 of a sawing machine 200 (i.e. miter saw). The adjustment device 100 comprises a support frame 10, an auxiliary fence 20 which is slidably disposed on the support frame 10, a guiding unit 30 which is disposed between the support frame 10 and the auxiliary fence 20 for selectively guiding the auxiliary fence 20 to longitudinally slide along the support frame 10 along a vertical direction (Y), and an adjusting unit 40 which is adapted for adjustably positioning the auxiliary fence 20 relative to the support frame 10.

The support frame 10 is slidable relative to the base 210 along a horizontal direction (X), such that the support frame 10 is able to slide toward or away from the base 210 of the sawing machine for adapting to different lengths of the workpieces to be cut. The support frame 10 has a pair of parallel spaced apart legs 11 that extend along the horizontal direction (X). A first guiding shaft 12 and a second guiding shaft 13 respectively extends upwardly from the legs 11, such that the first guiding shaft 12 and the second guiding shaft 13 are located parallel relative to each other, and are perpendicularly configured relative to the legs 11. A pillar 14 is interposed between the first guiding shaft 12 and the second guiding shaft 13. A first guiding portion 15 and a second guiding portion 16 are respectively formed on the first guiding shaft 12 and the second guiding shaft 13, and are likewise parallel relative to each other. The first guiding portion 15 and the second guiding portion 16 longitudinally extend along the vertical direction (Y) which is substantially perpendicular to the horizontal direction (X).

The auxiliary fence 20 comprises a panel 21 which is slidably assembled with the support frame 10 and a tab 22 which laterally extends from a top side of the panel 21. An opening 211 is defined in the panel 21. A first protrusion 221 downwardly protrudes from the tab 22 along the vertical direction (Y).

Figure 6:
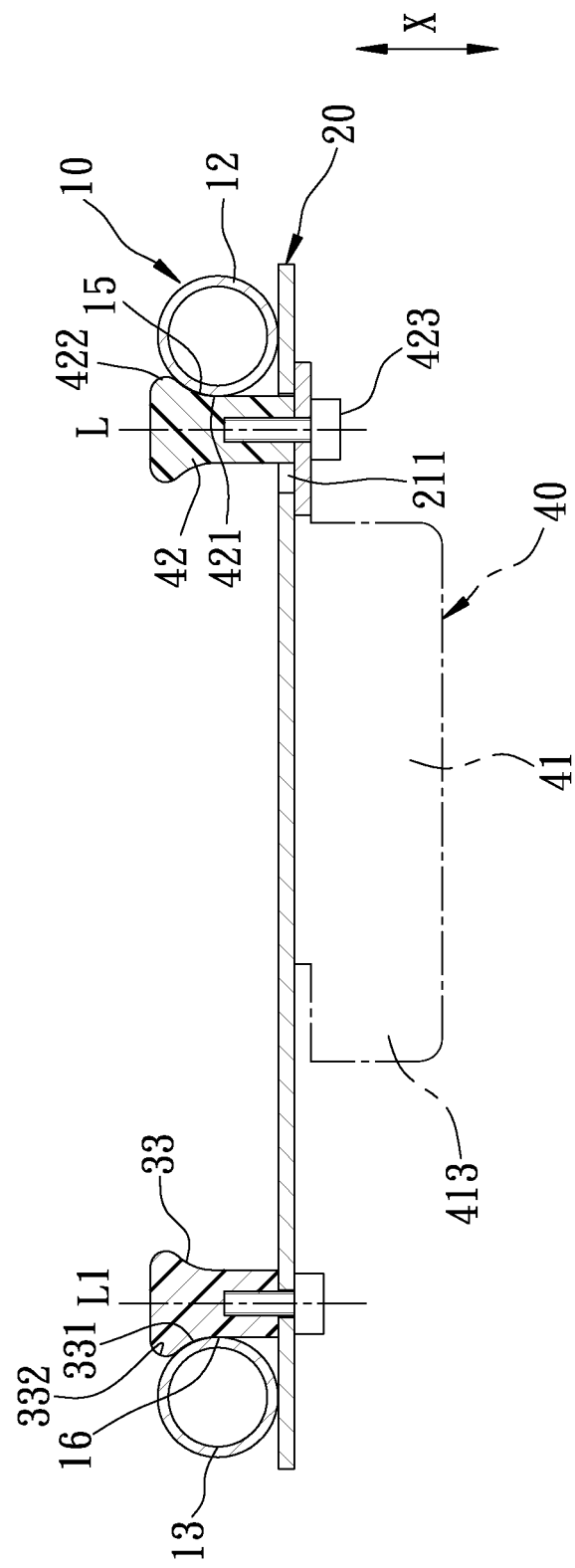
FIG. 6 is a cross-sectional view taken along line VI-VI in FIG. 5.

The guiding unit 30 has an elongated guiding slot 32 radially defined in the panel 21 of the auxiliary fence 20, the guiding unit 30 includes a substantially pillar-shaped guiding member 31, and a guide post 33. The guiding slot 32 longitudinally extends along the vertical direction (Y). The guiding member 31 passes through the guiding slot 32 and is threadedly secured to the pillar 14 of the support frame 10 such that the auxiliary fence 20 is slidable along the vertical direction (Y) relative to the support frame 10 within a distance of a length of the guiding slot 32. The guiding member 31 is generally located at a middle portion of the pillar 14. The guide post 33 is axially disposed on a lateral side of the panel 21 for corresponding to the support frame 10, and the guide post 33 extends from the panel 21 along an imaginary center line (L1) which is parallel to the horizontal direction (X) (as shown in FIG. 6) and correspondingly engages with the second guiding portion 16. The guide post 33 is substantially tubular-shaped and includes a large diameter portion 332 and a reduced diameter portion 331 respectively formed on two ends thereof, wherein the reduced diameter portion 331 corresponds to the second guiding portion 16. The second guiding shaft 13 is located between the large diameter portion 332 of the guide post 33 and the panel 21 of the auxiliary fence 20.

The adjusting unit 40 has a driving member 41, a tubular-shaped securing member 42, and an elastomer 43 such as an elastomeric element. The driving member 41 is substantially elongated, and has a pivot portion 411 and a trigger 413 respectively formed on two opposite ends thereof. The pivot portion 411 is pivotally connected to the auxiliary fence 20 such that the driving member 41 is pivotable relative to the auxiliary fence 20 via the pivot portion 411. An ancillary member 412 is formed on the driving member 41 and is located adjacent to the pivot portion 411; the ancillary member 412 is adapted for engaging with the securing member 42. The ancillary member 412 is correspondingly located relative to the opening 211 of the panel 21. The securing member 42 is threaded to the ancillary member 412 via a bolt 423 and passes through the opening 211 of the panel 21. The securing member 42 therefore extends from the panel 21 along another imaginary center line (L) which is also parallel to the horizontal direction (X) (as shown in FIG. 6) and correspondingly engages with the first guiding portion 15. The securing member 42 has a neck portion 421 extending therefrom which engages with the first guiding portion 15. A flange 422 is formed on the securing member 42 and is integrally attached with the neck portion 421 such that the first guiding shaft 12 is located between the flange 422 and the panel 21 of the auxiliary fence 20.

A second protrusion 414 is formed on the trigger 413 of the driving member 41. The second protrusion 414 upwardly extends from the driving member 41 along the vertical direction (Y) for corresponding to the first protrusion 221 which is located on the tab 22 of the panel 21. In the present embodiment, the elastomer 43 is a compression spring, wherein each end of the compression spring 43 fits over the first protrusion 221 and the second protrusion 414 respectively, such that the compression spring 43 is elastically disposed between the trigger 413 of the driving member 41 and the tab 22 of the auxiliary fence 20 for constantly urging the securing member 42 to orient toward the first guiding portion 15.

Figure 5:
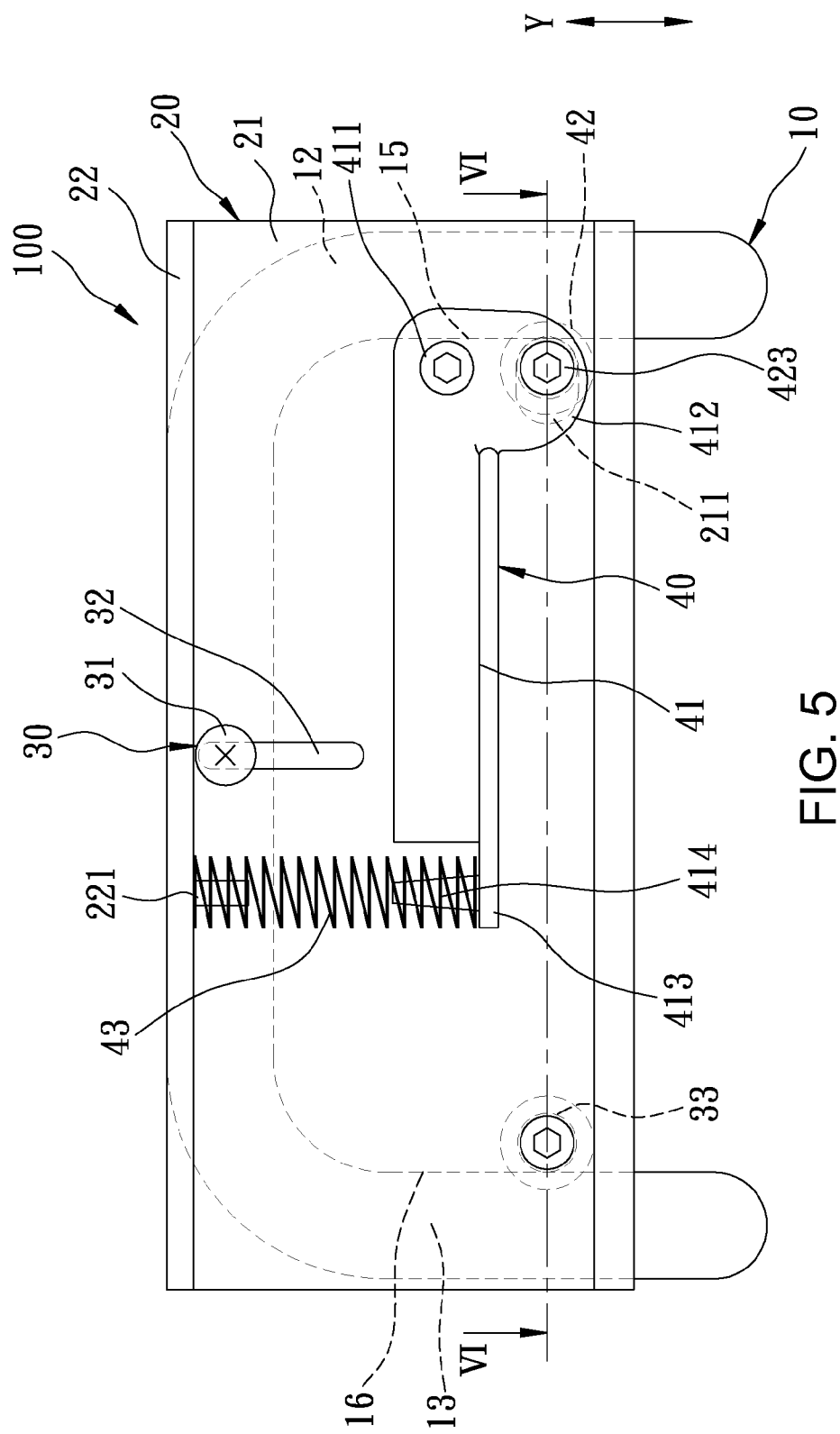
FIG. 5 is an front elevation view of the adjustment device for an auxiliary fence in accordance with the first embodiment of the present disclosure.

Further referring to FIGS. 5-7, operation of the adjustment device 100 for an auxiliary fence 20 in accordance with the present disclosure will be described in details below. When the adjustment device 100 has been appropriately assembled to the sawing machine 200, a resilient force of the compression spring 43 constantly urges the securing member 42 to constantly and frictionally contact the first guiding shaft 12, thereby the auxiliary fence 20 is positioned relative to the support frame 10. As shown in FIG. 6, the first guiding shaft 12 is located between the flange 422 of the securing member 42 and the panel 21 of the auxiliary fence 20, and the second guiding shaft 13 is located between the enlarged diameter portion 332 of the guide post 33 and the panel 21 of the auxiliary fence 20, the auxiliary fence 20 is thereby positioned relative to the support frame 10.

Figure 7:
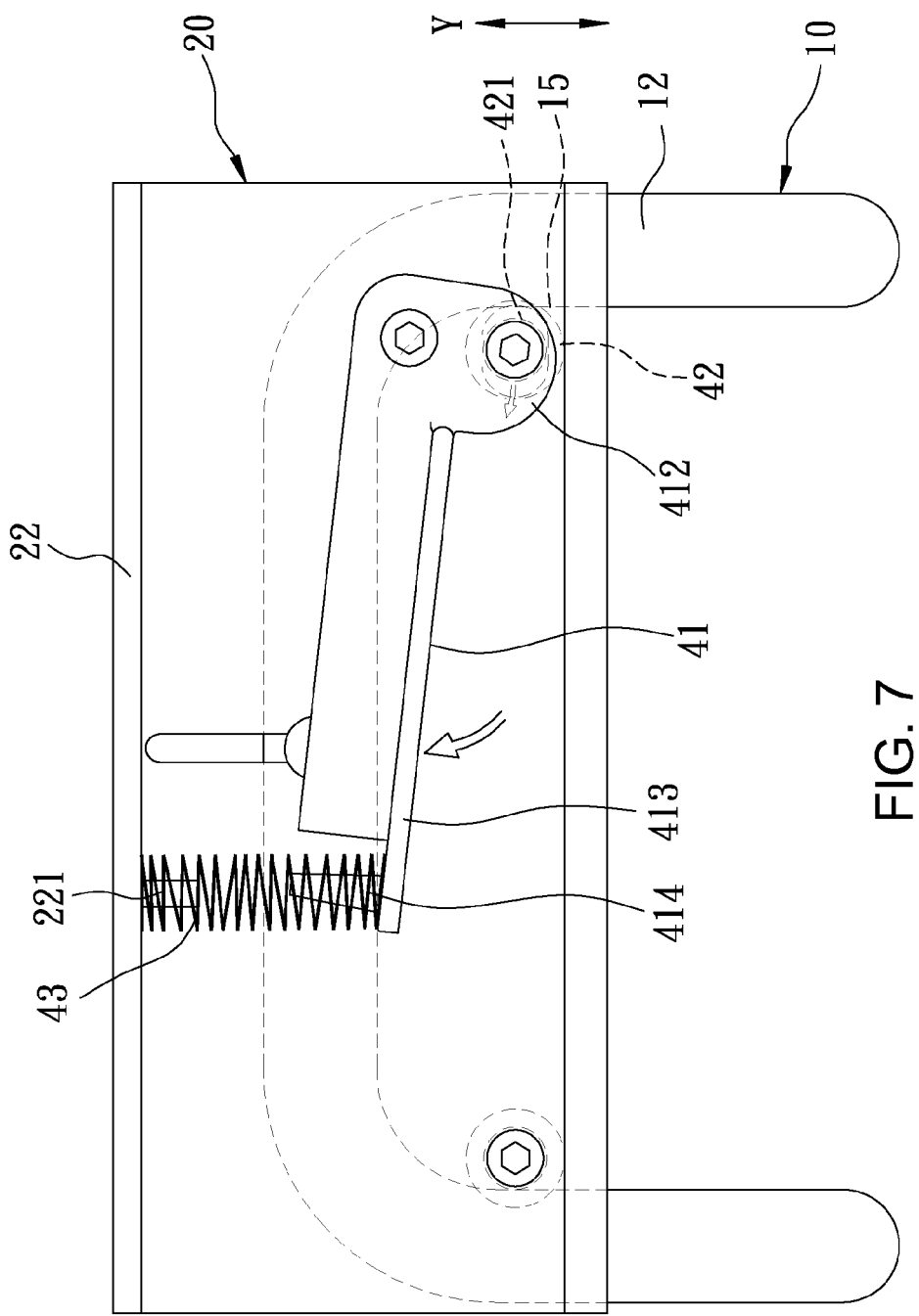
FIG. 7 is a front elevation view of the adjustment device for an auxiliary fence in accordance with the first embodiment of the present disclosure in operation, wherein the trigger is pressed such that the ancillary member is shown driving the securing member to disengage from the second guiding shaft.

Referring to FIG. 7, when intending to adjust a height of the auxiliary fence 20 relative to the support frame 10, a user uses one hand to press the trigger 413 of the driving member 41 such that the trigger 413 is drawn closer toward the tab 22 of the auxiliary fence 20, and wherein the compression spring 43 is compressed to store resilient force for elastic recovery. When the trigger 413 is pressed, the pivot portion 411 and the ancillary member 412 of the driving member 41 are driven to slightly and pivotally rotate. The securing member 42 is also driven by a pivotal rotation of the ancillary member 412 such that the neck portion 421 of the securing member 42 is driven to disengage from the first guiding portion 15 of the first guiding shaft 12. The auxiliary fence 20 is therefore free to slide relative to the support frame 10 along the vertical direction (Y) via the guiding slot 32. When the auxiliary fence 20 slides vertically relative to the support frame 10, the guide post 33 is likewise guided by movements of the auxiliary fence 20 to vertically slide along the second guiding portion 16 for assisting the auxiliary fence 20 to slide smoothly. When the auxiliary fence 20 is at a desired height relative to the support frame 10, the user releases the trigger 413, the compression spring 43 elastically recovers, such that the neck portion 421 of the securing member 42 once again frictionally contacts with the first guiding portion 15 of the first guiding shaft 12 for positioning the auxiliary fence 20 relative to the support frame 10. In addition, the guiding unit 30 collaborates with the adjusting unit 40 for assuring smooth operation and adjustment.

Figure 8:
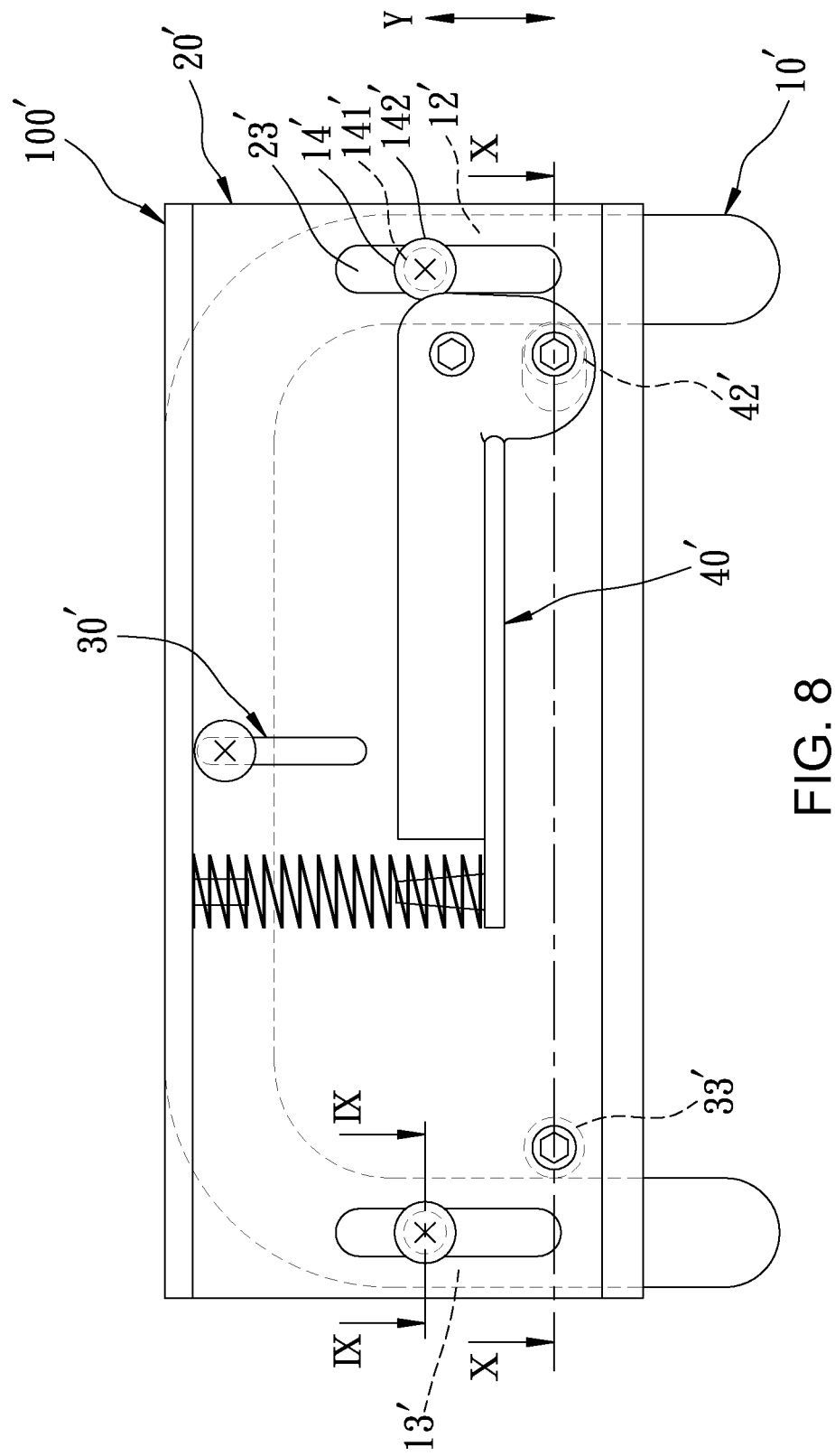
FIG. 8 is a front elevation view of the adjustment device for an auxiliary fence in accordance with a second embodiment of the present disclosure.
Figure 9:
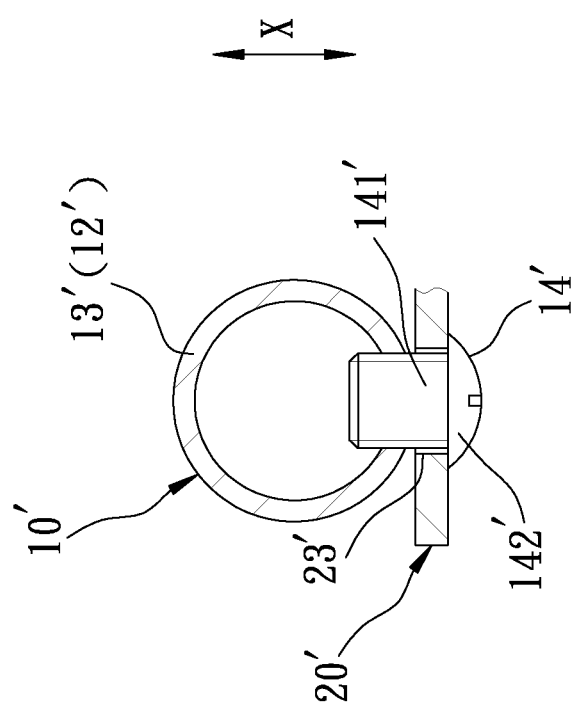
FIG. 9 is a cross-sectional view taken along line IX-IX in FIG. 8.
Figure 10:
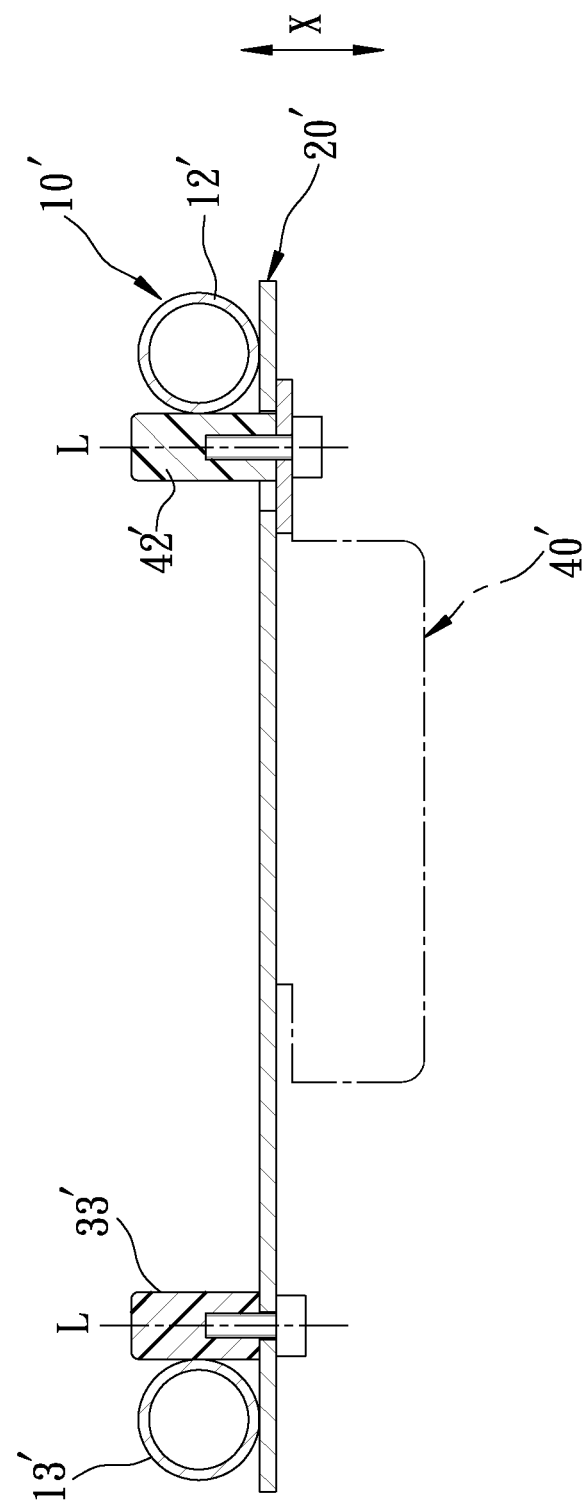
FIG. 10 is a cross-sectional view taken along line X-X in FIG. 8.

With reference to FIGS. 8-10, a second embodiment of the present disclosure is shown. The elements and effects of the second embodiment that are the same as the preferred embodiment are not described; only the differences between the embodiments are described. In this embodiment, the adjustment device 100' for an auxiliary fence 20' includes a support frame 10', an auxiliary fence 20', a guiding unit 30' and an adjusting unit 40'. In this embodiment, the securing member 42' and the guide post 33' are likewise tubular-shaped, the panel 21' of the auxiliary fence 20' has a pair of elongated slots 23' which are longitudinally defined therein and extend along the vertical direction (Y); the support frame 10' includes a pair of limiting members 14' respectively corresponding to the elongated slots 23'. The limiting members 14' are respectively mounted to the first guiding shaft 12' and the second guiding shaft 13'. Each limiting member 14' comprises a post 141' which passes through the corresponding elongated slot 23' and an enlarged head 142'; the enlarged head 142' abuts against the auxiliary fence 20' such that auxiliary fence 20' is sandwiched between the support frame 10 and the enlarged heads 142'. The limiting members 14' disclosed herein are bolts.

In view of the above, by utilizing the adjusting unit 40 and the guiding unit 30, a position of the auxiliary fence 20 relative to the support frame 10 can be quickly and easily adjusted.

Although particular embodiments of the disclosure have been described in detail for purposes of illustration, various modifications and enhancements may be made without departing from the spirit and scope of the disclosure. Accordingly, the disclosure is not to be limited except as by the appended claims.

What is claimed is:

1. An adjustment device for an auxiliary fence, comprising:
a support frame having a first guiding portion and a second guiding portion formed thereon, the first and the second guiding portions extending longitudinally parallel relative to each other in a first direction;
an auxiliary fence located on a lateral side of the support frame;
a guiding unit located pass through the support frame and the auxiliary fence and arranged for selectively guiding the auxiliary fence to slide relative to the support frame along the first direction; and
an adjusting unit arranged for adjustably positioning the auxiliary fence relative to the support frame, the adjusting unit having a driving member pivotally connected to the auxiliary fence, a securing member mounted to the driving member, and an elastomeric element located between the driving member and the auxiliary fence and arranged for constantly urging the securing member to engage the first guiding portion;
wherein the driving member has a pivot portion and a trigger respectively formed on two opposite ends thereof, the pivot portion pivotally connected to the auxiliary fence.

2. The adjustment device according to claim 1, further comprising an ancillary member formed on the driving member and located adjacent to the pivot portion, the ancillary member adapted for engaging with the securing member.

3. The adjustment device according to claim 2, wherein the auxiliary fence defines an opening corresponding to the ancillary member such that the securing member passes through the opening for slidably engaging the first guiding portion.

4. The adjustment device according to claim 1, wherein the elastomeric element is a compression spring abuttingly located between the auxiliary fence and the trigger of the driving member.

5. The adjustment device according to claim 1, wherein the support frame has first and second guiding shafts extending parallel to each other, and a pillar interposed between the first and second guiding shafts, such that the first and second guiding portions are respectively located longitudinally on the first and second guiding shafts.

6. The adjustment device according to claim 5, wherein the securing member is substantially tubular-shaped.

7. The adjustment device according to claim 5, wherein the guiding unit comprises a guiding slot defined in the auxiliary fence, and a guiding member correspondingly passing through the guiding slot and secured to the pillar of the support frame.

8. The adjustment device according to claim 7, wherein the guiding slot is substantially elongated and longitudinally extends along the auxiliary fence in the first direction.

9. The adjustment device according to claim 8, wherein the guiding member of the guiding unit is substantially cylindrical-shaped.

10. The adjustment device according to claim 8, further comprising a guide post axially located on a lateral side of the auxiliary fence for slidably engaging the second guiding portion.

11. The adjustment device according to claim 10, wherein the guide post is substantially tubular-shaped.

12. The adjustment device according to claim 1, wherein the support frame has first and second guiding shafts that extend parallel to each other, and a pillar interposed between the first and second guiding shafts, such that the first guiding and second guiding portions are respectively located longitudinally on the first and second guiding shafts, and the guiding unit having a guiding member securely mounted to the pillar of the support frame.

13. The adjustment device according to claim 12, wherein the securing member has a neck portion that corresponds to the first guiding portion, and a flange attached to the neck portion such that the first guiding shaft is located between the flange and the auxiliary fence.

14. The adjustment device according to claim 12, further comprising a guide post axially located on a lateral side of the auxiliary fence and arranged for slidably engaging the second guiding portion, the guide post including a large diameter portion and a reduced diameter portion formed on two opposite ends thereof such that the reduced diameter portion corresponds to the second guiding portion, and the second guiding shaft being located between the large diameter portion and the auxiliary fence.

15. The adjustment device according to claim 14, wherein both the securing member and the guide post are substantially tubular-shaped.

16. The adjustment device according to claim 12, wherein the auxiliary fence has a pair of elongated slots longitudinally defined therein, and the support frame includes a pair of limiting members corresponding to the respective elongated slots.

17. The adjustment device according to claim 16, wherein each limiting member comprises a post passing through the corresponding elongated slot and having an enlarged head abutting the auxiliary fence such that the auxiliary fence is interposed between the support frame and the enlarged head.

18. An adjustment device for an auxiliary fence comprising:
   a support frame having first and second guiding portions formed thereon, the first and second guiding portions longitudinally extending parallel relative to each other along a first direction;
   an auxiliary fence located on a lateral side of the support frame, the auxiliary fence including a panel having a tab laterally extending from a top side thereof, and a first protrusion extending downwardly from the tab;
   a guiding unit located pass through the support frame and the auxiliary fence and arranged for selectively guiding the auxiliary fence to slide relative to the support frame along the first direction; and
   an adjusting unit arranged for adjustably positioning the auxiliary fence relative to the support frame, the adjusting unit having a driving member pivotally connected to the auxiliary fence, a securing member mounted to the driving member, and an elastomeric element located between the driving member and the auxiliary fence and arranged for constantly urging the securing member to engage with the first guiding portion, and the driving member including a second protrusion extending upwardly corresponding to the first protrusion.

19. An adjustment device for an auxiliary fence comprising:
   a support frame having first and second guiding portions formed thereon, the first and second guiding portions longitudinally extending parallel relative to each other along a first direction;
   an auxiliary fence located on a lateral side of the support frame, the auxiliary fence including a panel with a tab laterally extending from its top side, and a first protrusion extending downwardly from the tab; and
   an adjusting unit arranged for adjustably positioning the auxiliary fence relative to the support frame, the adjusting unit having a driving member pivotally connected to the auxiliary fence, a securing member mounted to the driving member, and an elastomeric element located between the driving member and the auxiliary fence for constantly urging the securing member to engage with the first guiding portion, and the driving member including a second protrusion extending upwardly for corresponding to the first protrusion such that a first end of the elastomeric element connects to the first protrusion and a second end of the elastomeric element connects to the second protrusion.

* * * * *